Patented Nov. 11, 1947

2,430,821

UNITED STATES PATENT OFFICE 2,430,821

UNSATURATED 3-SULFOLANYLAMINES

Rupert C. Morris, Berkeley, and Alva V. Snider, Richmond, Calif., assignors to Shell Development Company, San Francisco, Calif., a corporation of Delaware No Drawing. Application July 7, 1944, Serial No. 543,960

6 Claims. (Cl. 260—329)

This invention relates to unsaturated amines and to a method for their production. More particularly the invention pertains to a novel class of unsaturated amines which comprises those unsaturated amines wherein a 3-sulfolanyl radical and at least one allyl-type hydrocarbon radical are attached to an amino nitrogen atom, and to a novel method for the production of such compounds which comprises reacting a sulfolene with an allyl-type amine. In one of its more specific embodiments, the invention relates to 3-allylaminosulfolane and to a method for its production which comprises reacting sulfolene with allylamine.

Compounds of the type wherein a 3-sulfolanyl radical and a saturated hydrocarbon radical are linked to an amino nitrogen atom are known. The compounds of the present invention are distinguishable from these known compounds, however, in that an unsaturated hydrocarbon radical, i. e. an allyl-type radical, is attached to the amino nitrogen atom. It has been found that the resulting unsaturated sulfolanyl compounds possess inherent properties which unexpectedly are markedly superior to those of the corresponding saturated compounds. These properties could not be foreseen and they are of such a nature that they make the compounds of the invention particularly useful in various applications.

For example, the compounds of the invention are uniquely miscible with synthetic rubbers and other highly polymeric substances and impart to such synthetic polymers desirable qualities. They are therefore useful plasticizers and softening agents for such polymeric substances. The herein-described unsaturated amines are likewise particularly effective insecticidal toxicants and are therefore useful as insecticides or as active constituents of insecticidal compositions. When reacted with a compound such as para-toluene sulfonyl chloride, the unsaturated amines of the invention form a product which is compatible with nitrocellulose and is an excellent plasticizer therefor. This product also imparts unusual brilliance and polish to nitrocellulose compositions. The N-allyl 3-sulfonylamines of the invention are useful as detergents or as basic components of detergent mixtures. They may be used as sulfone soaps in the manufacture of greases. Because of their unsaturated nature they may be used as raw materials for the production of a variety of resins or polymers of the polyacrylate type. These resins or polymers have, because of their nitrogen content and because of the presence of the sulfolanyl nucleus, properties and uses not characteristic of other types of acrylate resins. The unsaturated amines of the invention have highly active physiological properties and may be used per se as therapeutic agents or in the manufacture of highly effective therapeutic agents. For example, the N-allyl 3-sulfolanylamines may be reacted with an acid chloride of the type of para-toluenesulfonyl chloride to form a drug of the sulfanilamide type. The unsaturated amines may also be used as intermediates in the production of a wide variety of other useful compounds. They may, for example, be chlorinated to form chlorine-containing compounds, reacted with a hypohalous acid to form a chlorohydrin, reacted in some cases with a primary aliphatic alcohol to form an ether, etc. The N-allyl sulfolanylamines of the invention are further distinguishable from the corresponding saturated amines of the prior art in that they may not be readily prepared by methods which are applicable to the preparation of the prior art compounds but require, in many cases, special methods of preparation, as is more fully disclosed hereinbelow.

The novel compounds of the invention comprise in general the unsaturated amines wherein a 3-sulfolanyl radical and at least one allyl-type radical are attached to an amino nitrogen atom. Typical of this class of compounds is 3-allylaminosulfolane, which has the formula

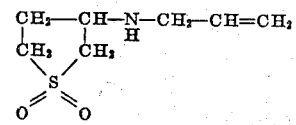

This compound may also be named N-allyl 3-sulfolanylamine, N-allyl 3-aminocyclotetramethylenesulfone, N-allyl 3-amino-2,3,4,5-tetrahydrothiophene-1,1-dioxide or N-allyl 3-aminothiolane-1,1-dioxide. The invention is not restricted, however, to the compound 3-allylaminosulfolane, the formula of which is given above. It also includes the group of compounds of related structure which may be prepared in a manner similar to that which may be used for the preparation of 3-allylaminosulfolane and which have properties similar to the properties of that compound. Included within the scope of the invention are, for example, those N-allyl sulfolanylamine derivatives wherein one or more of the hydrogen atoms which are substituted upon a nuclear carbon atom of the sulfolanyl ring are replaced with a suitable substituent group. Suitable substituent groups are the alkyl groups, e. g. a methyl group, the alkenyl groups, the aryl radicals, the hydroxyl group, the alkoxy groups, e. g. the methoxy radical, the nitrile group, an amino group, an alkylamino group, an ester group, a halogen atom such as a chlorine atom or a bromine atom, etc.

The unsaturated group which is attached to the amino nitrogen atom may be any allyl-type group. It may therefore be any group which contains an arrangement of carbon atoms such that the carbon atom which is attached to the amino nitrogen atom is also attached through a single bond to a second carbon atom which in turn is attached through a double bond to a third carbon atom. The other valences of these three carbon atoms may be satisfied by union with hydrogen atoms or with suitable other atoms or structural groupings. They may be attached, for example, to alkyl radicals such as the methyl, ethyl, propyl, butyl, amyl, hexyl, heptyl, octyl, nonyl, decyl, phenyl, cyclohexyl, etc., groups, to a halogen atom, e. g. a chlorine atom, to an alkoxy group, e. g. a methoxy group, or to a hydroxyl group.

Representative allyl-type groups which may be attached to the nitrogen atom of the amino group are the allyl, methallyl, crotyl, chloroallyl, methoxyallyl, ethallyl, 1-methylallyl, 1-ethylallyl, 1-propylallyl, 1,1-dimethylallyl, 1-methyl-1-ethylallyl, 1,1-diethylallyl, 1,2-dimethylallyl, 1-ethyl-2-methylallyl, 1,1,2 - trimethylallyl, 1 - vinylallyl groups, as well as the tiglyl and cinnamyl radicals.

The third valence of the amino nitrogen atom may be taken up by an allyl-type radical of the type described above, or it may be occupied by any one of a variety of elements or organic radicals. Attached to the said third valence of the amino nitrogen atom may be, for example, a hydrogen atom, a chlorine or other halogen atom or a hydrocarbon radical such as a methyl, ethyl, n-propyl, i-propyl, n-butyl, sec-butyl, i-butyl, amyl, heptyl, octyl, nonyl, decyl, pentadecyl, octadecyl, phenyl, tolyl, xylyl, naphthyl, alkylnaphthyl, phenanthryl, alkylphenanthryl, cyclopentyl, methyl cyclopentyl, dimethylcyclopentyl, cyclohexyl, alkylcyclohexyl, or olefinic group or the suitably substituted derivatives thereof.

When the said third valence bond of the amino nitrogen atom is linked to a phenylsulfonyl radical, e. g. a para-toluenesulfonyl radical, a class of compounds results the members of which have remarkable therapeutic properties and are useful in chemo-therapy as drugs of the sulfa-type.

The following are representative of the novel compounds of the invention:

3-allylaminosulfolane
3,3-diallylaminosulfolane
3-allyl-3-methallylaminosulfolane
3-allylamino-2-methylsulfolane
3-allylamino-2,5-dimethylsulfolane
3-allylamino-2,4-dimethylsulfolane
3-allylamino-2-chlorosulfolane
3-allylamino-4-methylsulfolane
3-allylamino-3-methylsulfolane
3-allylamino-2-bromosulfolane
3-allylamino-2-hydroxysulfolane
3-allylamino-2-methoxysulfolane
3-allylamino-5-methylsulfolane
3-allylamino-2-ethylsulfolane
3-allylamino-3-ethyl-2-methylsulfolane
3-methallylamino-2-methylsulfolane
3-methallylamino-2-chlorosulfolane
3-methallylamino-2-hydroxysulfolane
3-methallylamino-5-methylsulfolane
3-methallylamino-2-ethylsulfolane
Allylamino-3-methylsulfolane
Allylamino-2-methyl-3-propylsulfolane
Methallylamino-3-methylsulfolane
N-3-sulfolanyl-N-allylpara-toluenesulfonamide The unsaturated amines of the invention may be prepared by any method known to the art for the production of compounds of the same or similar structural types. They may be prepared, for example, by reacting a 3-amino-sulfolane with an allyl-type halide, e. g. allyl chloride. It is preferred, however, to prepare the 3-allylaminosulfolanes of the invention by a novel method which essentially comprises reacting a sulfolene with an allyl-type amine under conditions which are peculiarly suited to the formation of allyl-type amines. The basic reaction which takes place may be represented by the following equation for the preparation of 3-allylaminosulfolane from 3-sulfolene and allylamine:

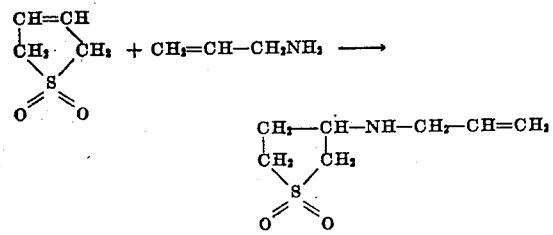

It has been found that, although a sulfolene will react with an allyl-type amine at elevated temperatures and pressures to form a 3-allylaminosulfolane, the reaction does not proceed as rapidly or smoothly as it does in the case of the reaction between a sulfolene and a saturated primary amine and the yields of product are relatively low. The product is, furthermore, often contaminated with sulfur dioxide or with other undesirable sulfur-containing compounds. This difficulty may be avoided by resorting to one or both of two novel expedients for the production of 3-allylamino-sulfolanes by the presently-disclosed process.

It has been found, for example, that the reaction between the sulfolene and the allyl-type amine may be greatly promoted by the addition of a small amount of an alkali substance such as a basic compound of an alkali metal, e. g. potassium hydroxide. This establishes a reaction mixture which is sufficiently alkaline to be favorable to the formation of high yields of 3-allylaminosulfolanes.

The reaction is also promoted and high yields of 3-allylaminosulfolane formed by use of a relatively large excess of the allyl-type amine. This is of particular importance when it is desired to prepare a product which is free from sulfur dioxide or other sulfur-containing contaminants. Use of a large excess of allyl-type amine insures the conversion of substantially all of the sulfolene to a 3-allylaminosulfolane. When the reaction product is distilled to separate the 3-allylaminosulfolane product there is therefore little if any unreacted sulfolene present in the charge to the still. This fact is responsible for the freedom of the product from sulfur dioxide and other undesirable sulfur-containing compounds, since the sulfolenes tend to decompose when distilled and form sulfur compounds of undesirable types.

A preferred method for the production of the novel 3-allylaminosulfolanes of the invention therefore essentially comprises reacting a molecular excess of an allyl-type amine with a sulfolene at an elevated pressure, at an elevated temperature, and in the presence of a catalyst comprising a basic compound of an alkali metal. Stated more specifically, the presently disclosed novel process for the production of the 3-allylaminosulfolanes of the invention comprises reacting one mole of a sulfolene with from about one mole to about ten moles of an allyl-type amine at a pressure of from about 15 p. s. i. to about 500 p. s. i. at a temperature of from about 20° C. to about 120° C. and in the presence of from about 0.1% to about 1.0% of a catalyst comprising a basic alkali metal compound, and separating the 3- allylaminosulfolane product from the reaction mixture. A preferred embodiment may be illustrated by that which may be used to prepare 3-allylaminosulfolane from sulfolene. In accordance with this embodiment about one mole of sulfolene may be reacted with about five moles of allylamine. About 0.5% of an aqueous sodium hydroxide solution may be added to the reaction mixture to act as a catalyst for the reaction. The reaction mixture may be maintained at a temperature of about 60° C. and a pressure of between about 50 p. s. i. and about 100 p. s. i. for the reaction period. When the reaction is complete the reaction mixture may be distilled to separate the 3-allylaminosulfolane therefrom.

A variety of sulfolenes may be used in this synthesis. The sulfolene may be unsubstituted or substituted with alkyl or other groups as described hereinabove. It is immaterial in most cases whether an alpha-sulfolene (2-sulfolene), i. e. a sulfolene wherein the double bond is between the No. 2 and the No. 3 carbon atoms, or between the No. 4 and No. 5 carbon atoms of the sulfolene nucleus, or a beta-sulfolene (3-sulfolene), i. e. a sulfolene wherein the double bond is between the No. 3 and the No. 4 carbon atoms, is employed. It has been found, for example, that 3-allylaminosulfolane is produced from either alpha-sulfolene or beta-sulfolene by the reaction between these compounds and allylamine. It is probable that under the conditions of the reaction but one of these isomeric sulfolenes is stable and that the other rearranges in the alkaline reaction mixture to form the stable isomer which then reacts with the allyl-type amine.

The following sulfolenes, which may be of either the alpha-sulfolene type or the beta-sulfolene type, may be condensed with allyl-type amines to form 3-allylaminosulfolanes in accordance with the presently-disclosed process: sulfolene, 2 - methylsulfolene, 2,5 - dimethylsulfolene, 2,4-dimethylsulfolene, 3,4-dimethylsulfolene, 4-methylsulfolene, 3-methylsulfolene, 3-ethylsulfolene, 2-hydroxysulfolene, 2-methoxysulfolene, 5-methylsulfolene, 2-ethylsulfolene, 2-methyl-3-ethylsulfolene, 2-methyl - 3 - propylsulfolene and their suitable substitution products.

Typical allyl-type amines which may be employed in the synthesis comprise allylamine, methallylamine, ethallylamine, chloroallylamine, 3-amino - butene-1,3-aminopenten - 1,3-aminohexen-1,3 - amino-3-methylbuten-1, 3-amino-3-methylpenten-1, 3 - amino-3-ethylpenten-1, 2-methyl-3-aminobuten-1, 2-methyl - 3-aminopenten-1, 2,3-dimethyl-3 - aminobuten-1, 3-aminopentadiene-1,4, 3-aminohexen-1-yne-5, 2-methyl-3-aminopenten-1-yne-4, and 2,5 - dimethyl - 4-aminohexadiene-1,5. Other allyl-type amines are crotylamine, tiglyamine, 1 - amino - 3 - chlorobuten-2, cinnamylamine, 1-aminohexadiene-2,4, 1-aminohexadiene-2,5, 1-aminobutadiene-2,3, 2-aminohexadiene-3,5, 1 - amino-2-methylhexen-2, 1-amino-2-methylpenten-2, 1-amino-3,7-dimethyloctadiene-2,7, 1- a m i n o - 2 - cyclohexene, 1-amino-2-cyclopentene, etc.

As stated, an alkaline substance is usually employed to establish an alkaline reaction mixture. Suitable alkaline substances comprise in general the more basic compounds of the alkali metals as well as certain of the strong organic bases. Suitable basic compounds include trimethylbenzyl ammonium hydroxide, sodium hydroxide, sodium carbonate, potassium hydroxide, potassium carbonate, lithium hydroxide, caesium hydroxide, rubidium hydroxide and the like. Preferred members of this group are potassium hydroxide, sodium hydroxide and sodium carbonate because of their effective action and their ready availability. These compounds may be used in any effective amount. In most cases an amount of between about 0.1% and about 3.0%, preferably about 1.0% based on the weight of sulfolene used is an effective and satisfactory amount. They may preferably be used in the form of their aqueous solutions, e. g. solutions containing from about 0.1% to about 40% by weight of basic alkali metal compound.

The ratio of allyl-type amine to sulfolene is variable, depending upon the type of the reactants and the conditions of the reaction. As stated, however, it is usually important that a relatively large excess on a mole basis of allyl-type amine be used in order to effect high conversions of sulfolene to a 3-allylaminosulfolane. Suitable ratios of allyl-type amine to sulfolene will lie within the range of between about one molecular equivalent of allylamine to one molecular equivalent of sulfolene and about 20 moles of allyl-type amine per mole of sulfolene. A preferred ratio in the case of the production of 3-allylaminosulfolane from allylamine and 3-sulfolene is about 1 molecular equivalent of 3-sulfolene to about 5 molecular equivalents of allylamine.

The temperature of the reaction is likewise variable, depending upon the nature of the reactants and the other operating conditions. In general the upper temperature limit is the decomposition temperature of the sulfolene. In the case of beta-sulfolene, this temperature is about 120° C. The lower temperature limit is that temperature which is necessary to initiate the desired reaction. This temperature is usually about normal room temperature, or about 20° C. to 25° C. It is usually preferred to operate at some intermediate temperature range, i. e. a temperature range of between about 40° C. and about 80° C. In preparing 3-allylaminosulfolane from 3-sulfolene and allylamine, a temperature of about 60° C. is a particularly desirable and effective operating temperature.

Although the reaction between the allyl-type amine and the sulfolene will take place at atmospheric pressures, it is usually desirable to operate at superatmospheric pressures, i. e. pressures of between about atmospheric pressure and about 500 p. s. i. Preferred operating pressures lie within the range of between about 50 p. s. i. and about 100 p. s. i. The pressure may be maintained constant throughout the reaction, or increased or decreased as desired as the reaction progresses.

The process of the invention for the production of unsaturated aminosulfolanes may be carried out in any suitable type of apparatus. It may be carried out in either a batch or a continuous manner. When operating in a continuous manner, a quantity of sulfolene may be continuously contacted in a suitable reaction vessel with an excess of an allyl-type amine in the presence of a basic catalytic substance, the reaction product continuously withdrawn from the said reaction vessel and separated into its constituents, the unreacted allyl-type amine being continuously recycled into the said reaction chamber.

The following examples wherein the parts are parts by weight illustrate the invention.

*Example 1*

A reaction mixture was formed which comprised about 6 parts of allylamine, about 1 part of beta-sulfolene and about 0.5 part of a 40% aqueous solution of potassium hydroxide. This reaction mixture was heated in a pressure vessel at a temperature of about 60° C. and a pressure of 50–100 p. s. i. When the reaction was complete the reaction mixture was distilled without removal of the potassium hydroxide catalyst or neutralization thereof. A yield of about 97% of 3-allylaminosulfolane was obtained. It boiled at 145° C. at 1 mm. and was light yellow in color.

*Example II*

3-methallylsulfolane is prepared from beta-sulfolene, methallylamine, and a small amount of sodium hydroxide catalyst, using substantially the same procedure as described in Example I.

*Example III*

3-diallylaminosulfolane may be prepared by the reaction of sulfolene with a molar excess of diallylamine, using a potassium hydroxide catalyst, the temperature being maintained at 60° C. to 100° C. and the pressure kept at 50 p. s. i. to 100 p. s. i. during the course of the reaction.

*Example IV*

3-methylallylaminosulfolane is prepared by heating a mixture comprising alpha-sulfolene, methylallylamine and a small amount of an aqueous solution of sodium carbonate catalyst at a temperature of between 40° C. and 100° C. and a pressure of 50 p. s. i. to 100 p. s. i.

*Example V*

3-allylamino-5-methylsulfolane is prepared by reacting 5-methyl-alpha-sulfolene with a molar excess of allylamine in the presence of a small amount of an aqueous solution of sodium hydroxide at a temperature of from 40° C. to 100° C. and a pressure of from 50 p. s. i. to 100 p. s. i. When the reaction is complete the reaction mixture is distilled under reduced pressure to separate the 3-allylamino-5-methylsulfolane product.

We claim as our invention:

1. 3-monoallylaminosulfolane of the structural formula

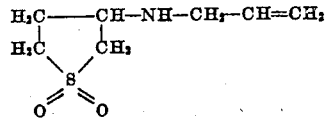

2. 3-monoallylamino-5-methylsulfolane of the structural formula

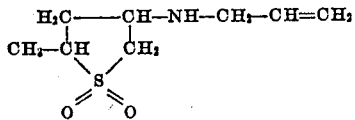

3. 3,3-diallylaminosulfolane of the structural formula

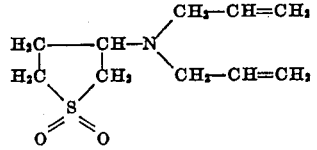

4. An unsaturated secondary amine wherein a 3-sulfolanyl radical and an aliphatic, mono-olefinic hydrocarbon radical are attached to the amino nitrogen atom, said hydrocarbon radical being directly linked to the amino nitrogen atom by a saturated carbon atom which is also directly linked to an olefinic carbon atom.

5. An unsaturated secondary amine having attached to an amino nitrogen atom a 3-sulfolanyl radical and a hydrocarbon radical containing an unsaturated linkage between two carbon atoms of an aliphatic group, one of which carbon atoms is directly attached to a saturated carbon atom which is also directly linked to said amino nitrogen atom.

6. An unsaturated amine having attached to an amino nitrogen atom a 3-sulfolanyl radical and a hydrocarbon radical containing an unsaturated linkage between two carbon atoms of an aliphatic group, one of which carbon atoms is directly attached to a saturated carbon atom which is also directly linked to said amino nitrogen atom.

RUPERT C. MORRIS.
ALVA V. SNIDER.

REFERENCES CITED

The following references are of record in the file of this patent:

UNITED STATES PATENTS

| Number | Name | Date |
|---|---|---|
| 2,219,006 | Delfs | Oct. 22, 1940 |
| 2,360,860 | Morris and Shokal | Oct. 24, 1944 |